(12) United States Patent
Toyoda et al.

(10) Patent No.: US 9,742,237 B2
(45) Date of Patent: Aug. 22, 2017

(54) MOTOR CONTROL APPARATUS

(71) Applicant: DENSO CORPORATION, Kariya, Aichi-pref. (JP)

(72) Inventors: Hirokazu Toyoda, Kariya (JP); Manabu Nomura, Kariya (JP); Yosuke Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/969,349

(22) Filed: Dec. 15, 2015

(65) Prior Publication Data

US 2016/0183389 A1    Jun. 23, 2016

(30) Foreign Application Priority Data

Dec. 19, 2014  (JP) .................................. 2014-256897

(51) Int. Cl.
*F04D 15/00*    (2006.01)
*H02K 5/02*     (2006.01)
*F02M 59/00*    (2006.01)
*H02P 6/00*     (2016.01)

(52) U.S. Cl.
CPC ............... *H02K 5/02* (2013.01); *F02M 59/00* (2013.01); *H02P 6/00* (2013.01)

(58) Field of Classification Search
CPC ............................... H02K 11/33; B25B 21/00
See application file for complete search history.

(56) References Cited

U.S. PATENT DOCUMENTS

2014/0306563 A1    10/2014  Oyama et al.
2016/0168913 A1*    6/2016  Hay .......................... E21B 4/04
                                                                175/57

FOREIGN PATENT DOCUMENTS

JP    2006-027315 A    2/2006
JP    2012-228054 A    11/2012
JP    2014-050260 A    3/2014

* cited by examiner

*Primary Examiner* — Karen Masih
(74) *Attorney, Agent, or Firm* — Posz Law Group, PLC

(57) ABSTRACT

A motor control apparatus includes a motor, a motor controller, and a connection line. The motor is mounted to a vehicle and has a metal housing. The motor controller is separately provided with the motor, includes a housing and a circuit portion, is connected to the motor through a load line, and drives the motor by a drive current transmitted through the load line. A ground line of the circuit portion is connected to a body of the vehicle as a body earth. The connection line directly connects the metal housing of the motor and the circuit portion of the motor controller without through the housing of the motor controller.

9 Claims, 4 Drawing Sheets

MOTOR CONTROL APPARATUS

CROSS REFERENCE TO RELATED APPLICATION

This application is based on Japanese Patent Application No. 2014-256897 filed on Dec. 19, 2014, the disclosure of which is incorporated herein by reference.

TECHNICAL FIELD

The present disclosure relates to a motor control apparatus controlling a motor mounted to a vehicle.

BACKGROUND

Patent literature 1: JP 2006-27315 A

For example, Patent literature 1 discloses a configuration for reducing a common mode current at the time of using an electrically-driven compressor including an electric motor in an air-conditioner for a vehicle.

Since a portion between an electric motor and a motor housing is coupled through a stray capacity, when potential of the electric motor changes according to a switching operation of a motor controller (also referred to as a motor drive circuit), a current may leak from the electric motor to the motor housing. Due to this leakage current, an electric field noise may occur when the potential of the motor housing changes. In order to suppress the electric field noise, it may be effective to connect the motor housing with a body of a vehicle (also referred to as a vehicle body) to perform a body earth.

However, when the body earth of the motor housing is performed, and when a current route where the common mode current flows becomes a large loop through earth, a noise reduction effect may be reduced since intensity of an electric field noise is correlated with a loop area.

In order to reduce the noise by the common mode current, Patent literature 1 uses the following configuration. A motor controller is united with the electric compressor to provide a common housing, that is the motor controller and the electric compressor are provided integrally. The common housing is connected to a conductive film (corresponding to a sheath portion) of a shield wire having two core wires as a power source line and an earth line. The sheath portion of the shield wire is grounded to a body of the vehicle, and impedance in the earth route is set to large impedance to an extent that a leakage current does not generate an electric shock.

Since the impedance between the sheath portion and the vehicle body has a relatively large value, the current leaked to the vehicle body among the leakage current leaked to the common housing is reduced, and the remaining leakage current transmits to the core wire portion through the stray capacity between the sheath portion and the core wire portion to return (be refluxed) to the motor controller. According to this configuration, a magnitude of the loop of the common mode current is reduced, so that the noise is suppressed.

The inventors of the present disclosure have found the following. Patent literature 1 merely discloses a configuration for reducing the noise in a mechanically and electrically integrated apparatus in which the electric motor and the motor controller are integrated. However, it may be necessary to use a configuration having an electric motor and a motor controller as a different body (that is, separately) according to, for example, an ambient condition on which an electric motor is used.

SUMMARY

It is an object of the present disclosure to provide a motor control apparatus that enables to effectively reduce noise generated by a common mode current when a motor and a motor controller are provided separately.

According to one aspect of the present disclosure, a motor control apparatus includes a motor, a motor controller, and a connection line. The motor is mounted to a vehicle and has a metal housing. The motor controller is separately provided with the motor, includes a housing and a circuit portion disposed in the housing, is connected to the motor through a bad line, and drives the motor by a drive current transmitted through the load line. A ground line of the circuit portion is connected to a body of the vehicle as a body earth. The connection line directly connects the metal housing of the motor and the circuit portion of the motor controller without through the housing of the motor controller.

According to the motor control apparatus, the current leaked to the motor housing from the motor by a potential fluctuation of the motor directly flows back to the circuit portion of the motor controller through the connection wire without through the housing of the motor controller. Thus, the common mode current is refluxed only between the circuit portion of the motor controller and the motor (including the housing) without leaking to the housing of the motor controller. Accordingly, when the motor and the motor controller are provided independently, it may be possible to reduce the loop area of the current route where the common mode current flows as small as possible and it may be possible to reduce the noise by the common mode current effectively.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of a motor control apparatus according to the present disclosure will be explained based on the draw-

First Embodiment

Figure 1:
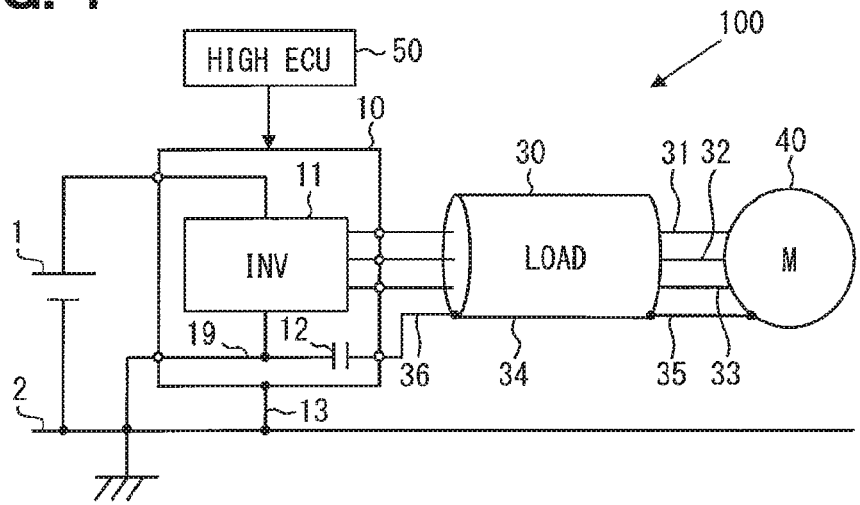
FIG. 1 is a diagram illustrating a schematic configuration of a motor control apparatus of a first embodiment.

FIG. 1 is a diagram illustrating a schematic configuration of a motor control apparatus 100 of a first embodiment. Incidentally, in the present embodiment, a motor 40 pumps up fuel stored in a fuel tank, and drives a fuel pump that provides the fuel to a fuel injection system. The fuel pump and the motor 40 are placed in the fuel tank, and are impregnated into the fuel. It may be difficult that a motor controller 10 and the motor 40 are provided integrally. Incidentally, the motor controller 10 may represent a housing of the motor controller and represent the motor controller as a whole including its inside configuration.

The motor 40 has a stator portion that generates rotating magnetic field and a rotor portion that rotates according to the rotating magnetic field. The stator portion and the rotor portion are accommodated in the interior of a metal housing of the motor 40. The motor 40 may be a brushless motor, for example. The brushless motor may be a three phase permanent magnet synchronous motor, such as an embedding magnet synchronous motor (IPMSM), for example. Alternatively, the motor 40 may be a motor with a brush, or may be another motor with a polyphase stator coil other than three phases. Incidentally, the motor 40 may represent a housing of the motor and represent the motor as a whole including its inside configuration.

The motor 40 is connected with an inverter 11 of the motor controller 10 through a load line 30. The load line 30 corresponds to a shield wire, and includes a harness portion and a connector, which is not illustrated. The connectors are provided in the ends of the harness portion. One of the connectors is connected to the motor controller 10, and the other of the connectors is connected to the motor 40. The motor controller 10 and the motor 40 are electrically connected through the load line 30.

More specifically, the harness portion of the load line 30 has a U phase current line 31, a V phase current line 32, and a W phase current line 33 as a core wire in the interior. The U phase current lines 31, the V phase current line 32, and the W phase current line 33 respectively are connected to a stator coil (a U phase coil, a V phase coil, and a W phase coil) of each phase of the stator portion of the motor 40. The load line 30 is provided with a conductive film 34 through an insulating material, so that the periphery of the U phase current line 31, the V phase current line 32, and the W phase current line 33 are wrapped. In addition, the periphery of the conductive film 34 is further provided with an insulating film. The conductive film 34 is included in a common cable that also includes the load line 30.

The conductive film 34 of the load line 30 is electrically connected to the metal housing of the motor 40 through a connection line 35 when one of the connectors is connected to the motor 40. The conductive film 34 is electrically connected to a fuel pump motor ground (FPG) terminal of the motor controller 10 through the connection line 36 when the other of the connectors is connected to the motor controller 10. Incidentally, the motor controller 10 also has a metal housing. However, in the present embodiment, the connection line 36, which is connected to the conductive film 34 of the load line 30, is not electrically connected to the metal housing of the motor controller 10. Instead, the connection line 36 is directly connected to the ground line 19 of a circuit portion in the motor controller 10 through the FPG terminal of the motor controller 10. Incidentally, the circuit portion may correspond to the part of the motor controller other than the housing, for example.

Figure 2:
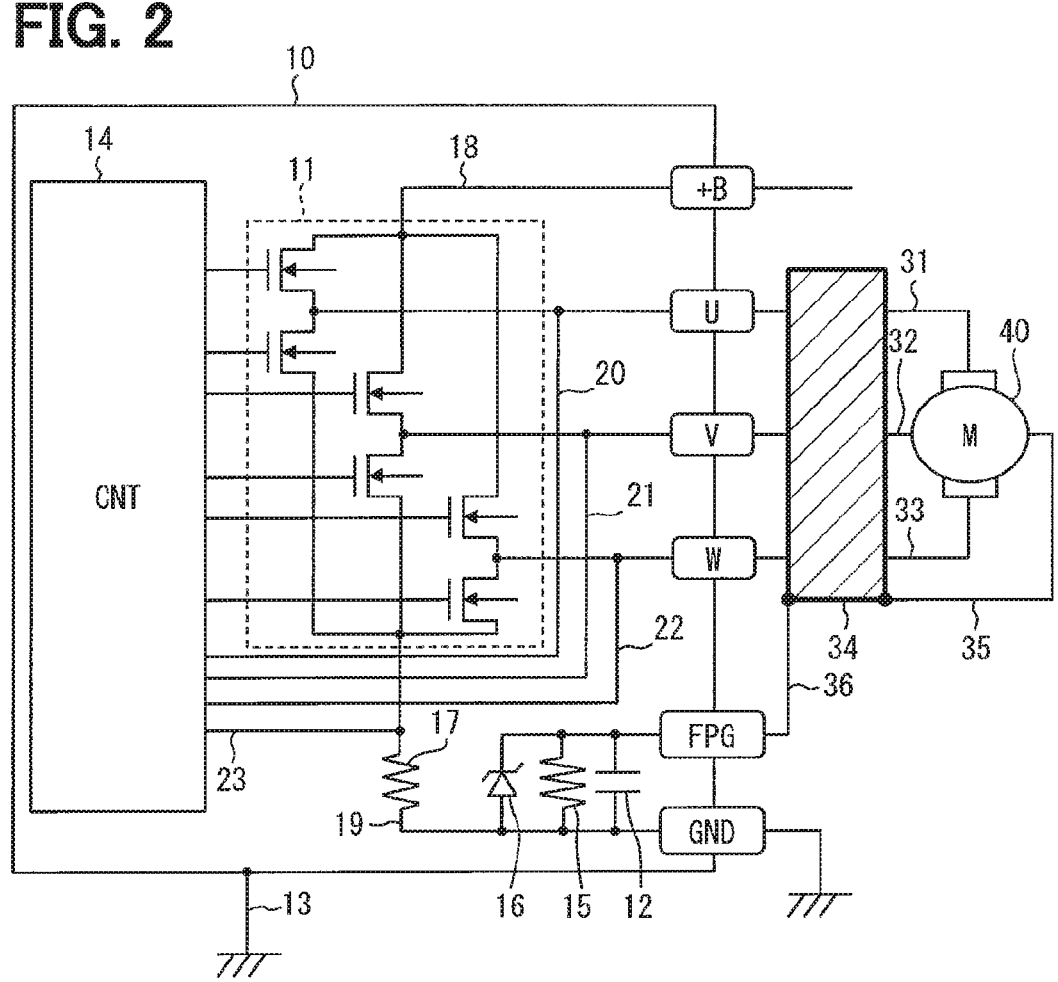
FIG. 2 is a diagram illustrating a schematic configuration of a motor controller of the motor control apparatus in the first embodiment.

In the motor controller 10, as illustrated in FIG. 2, a capacitor 12 as an alternate-current (AC) coupling means (also referred to as an AC coupling portion) is inserted between the FPG terminal and the ground line 19. Accordingly, when the potential fluctuation of the housing of the motor 40 occurs, the common mode current (that is, an alternating current component) changing based on the potential fluctuation passes the capacitor 12, and flows into the ground line 19. The ground lire 19 is connected to a body earth of a body 2 of the vehicle. The metal housing of the motor controller 10 is connected to the body earth of the body 2 of the vehicle by an earth line 13, being independent from the ground line 19.

As illustrated in FIG. 2, a resistance 15 and a Zener diode 16 respectively are connected between the FPG terminal and the ground line 19 in parallel with the capacitor 12. Therefore, when only the capacitor 12 is provided, since direct current (DC) component of a current is not flowed, the metal housing of the motor 40 may charge to a predetermined potential. By providing the Zener diode 16, it may be possible to prevent the metal housing from charging to a potential more than a predetermined voltage.

In addition, the present embodiment uses the conductive film 34 of the load line 30, so that the metal housing of the motor 40 is connected to the ground line 19 of the motor controller 10. Therefore, in addition to the U phase current line 31, the V phase current line 32, and the W phase current line 33 as the core wire, the load line 30 is also provided with the conductive film 34, which is used as a connection line connecting the metal housing of the motor 40 to the ground 19. Therefore, when a load is applied to the load line 30, it may be necessary to take into consideration a possibility that the core wire and the conductive film 34 may be short circuited. Regarding this point, in the present embodiment, the resistance 15 is provided in parallel with the capacitor 12. Thus, when any one of the U phase current line 31, the V phase current line 32, and the W phase current line 33 is short circuited with the conductive film 34, it may be possible to prevent an excessive current from flowing to the ground line 19 from the conductive film 34.

As illustrated in FIG. 2, a resistance 17 is inserted into the ground line 19. One end of the resistance 17 is connected to a control portion 14 of the motor controller 10 through a connection line 23 so as to detect voltage which is applied to the resistance 17. Thus, it may be possible that the control portion 14 detects that any one of the U phase current line 31, the V phase current line 32, and the W phase current line 33 is short circuited with the conductive film 34 in the load line, based on a terminal voltage of the resistance 17. The control portion 14 stops driving the motor 40 when the control portion 14 detects the short circuit. It may be possible to prevent a short circuit current from keeping flowing when any one of the V phase current line 31, the V phase current line 32, and the W phase current line 33 is short circuited with the conductive film 34. The control portion 14 corresponds to an example of a current detection portion in the present disclosure.

The motor controller 10 includes the inverter 11 and the control portion 14. As illustrated in FIG. 2, the inverter 11 includes three pairs of the switching elements, each of the three pairs of the switching elements being connected between a vehicular battery 1 and the ground (corresponding to the body earth) in series. The three pairs of the switching elements respectively correspond to a U phase coil, a V phase coil, and a W phase coil of the motor 40. A connection point of switching elements of each of the three pairs is connected to the U phase current line 31, the V phase current line 32, or the W phase current line 33 of the load line 30 through a U phase terminal, a V phase terminal, or a W phase terminal. Each of the connection points is connected to a stator coil in each phase of the motor 40.

The control portion 14 of the motor controller 10 outputs an operation signal for each of the switching elements in the inverter 11. The control portion 14 turns on a predetermined combination of a high potential switching element and a low potential switching element among the three pairs of the switching elements concurrently. The control portion 14 outputs the operation signal that changes a combination of the high potential switching element and the low potential switching element to be turned on. Thus, drive current from the vehicular battery 1 flows into the stator coil in each phase of the motor 40 in turn, and the rotation magnetic field for rotating the rotor of the motor 40 is generated.

The motor controller 10 in the present embodiment detects an induction voltage that is induced in an empty coil that the drive current does not flow, in the stator coil in each phase of the motor 40. Specifically, the motor controller 10 includes a connection line 20, a connection line 21, and a connection line 22. The connection line 20 connects the control portion 14 and the U phase terminal. The connection line 21 connects the control portion 14 and the V phase terminal. The connection line 24 connects the control portion 14 and the W phase terminal. The control portion 14 enables to detect the induction voltage generated in the stator coil in each phase through the connection lines 20-22. As described above, the motor controller 10 in the present embodiment detects a rotation position of the motor 40 (corresponding to the rotator) in a so-called sensor less manner. Alternatively, to detect the rotation position of the motor 40, a rotation position sensor such as a Hall element, a resolver may be used.

The control portion 14 performs processing such as amplification, a comparison with a reference potential, a wave shaping, a phase shift for the induction voltage of the stator coil in each phase, and generates a rotation position signal that indicates the rotation position of the motor 40. The control portion 14 detects a rotation speed of the motor 40 based on a temporal change of the rotation position signal. The control portion 14 generates and outputs the operation signal to supply the drive current to an energization phase that corresponds to the rotation position of the motor 40 indicated by the rotation position signal and to change the energization phase corresponding to a change of the rotation position. The operation signal includes a pulse width modulation (PWM) signal, and a magnitude of the drive current supplied to the motor 40 can be controlled according to a duty ratio of the operation signal. For example, since a motor torque increases when the drive current increases, the rotation speeds of the motor 40 increases. By contrast, when the drive current decreases, the rotation speed of the motor 40 reduces. Therefore, based on the duty ratio of the operation signal, it may be possible to control the rotation speed of the motor 40.

As illustrated in FIG. 1, the motor controller 10 is connected to a higher ECU 50 through, for example, an in-vehicle LAN. The motor controller 10 enables to communicate mutually according to a communication protocol such as a CAN protocol, a LIN protocol, or the like. The CAN protocol represents a controller area network protocol. The LIN protocol represents a local interconnect network protocol. The higher ECU 50 determines a target value regarding a control of the motor 40, and gives the target value to the motor controller 10 by communication.

For example, the higher ECU 50 calculates a fuel pressure of the fuel which the fuel pump should supply to the fuel injection system, based on an operation state and an operation load of a vehicle, and determines a target rotation speed of the motor 40 so as to satisfy the required fuel pressure. The higher ECU 50 provides the motor controller 10 with the calculated target rotation speed. The control portion 14 of the motor controller 10 generates the operation signal for making the rotation speed of the motor 40 coincide with the target rotation speed, and outputs the operation signal to the inverter 11. Accordingly, so that the rotation speed of the motor 40 coincides with the target rotation speed, a rotation control is performed.

Figure 3:
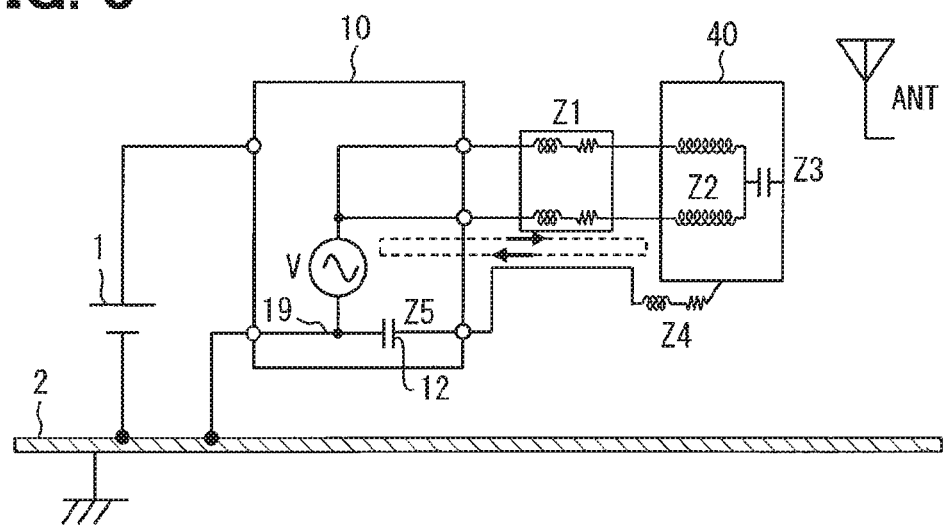
FIG. 3 is a diagram illustrating an equivalent circuit when any arbitrary combination of a high potential switching element and a low potential switching element in an inverter are turned on concurrently and a drive current flows in an stator coil of the corresponding motor.

An example of a technical feature of the motor control apparatus 100 in the present embodiment will be explained with reference to FIG. 3. FIG. 3 is a diagram illustrating an equivalent circuit when any arbitrary combination of the high potential switching element and the low potential switching element in the inverter 11 are turned on concurrently and the drive current flows in a stator coil of the corresponding motor 40.

In the motor control apparatus 100, when each of the switching elements in the inverter 11 is switched according to the operation signal, current is supplied to the stator coil in each phase of the motor 40 in turn. According to this energization of current, an electrical potential such as a midpoint in the motor 40 fluctuates. When the potential fluctuation occurs, as illustrated in FIG. 3, current leaks to the metal housing of the motor 40 through the stray capacity between the stator portion and the metal housing of the motor 40, and the common mode current occurs.

The common mode current leaked to the metal housing of the motor 40 flows into the ground line 19 of the motor controller 10 from the metal housing through the conductive film 34 of the load line 30 and the connection line 36. A conduction route of the common mode current based on the drive current generated by a switching operation of each switching element in the inverter 11 draws a loop including the inverter 11, the core wire in the load line 30, the motor 40, the metal housing of the motor 40, the conductive film 34 of the load line, and the inverter 11 in this order. As illustrated in the equivalent circuit of FIG. 3, when the inverter 11 is considered as a power source, the common mode current is refluxed in a closed circuit including an impedance Z1 by the core wire of the load line 30, an impedance Z2 by the stator coil of the motor 40, an impedance Z3 by the stray capacity, an impedance Z4 by the conductive film 34 of the load line 30, and an impedance Z5 by the capacitor 12.

In this case, the common mode current is directly refluxed to the inverter 11 of the motor controller 10 without leaking to the housing of the motor controller 10. As illustrated in FIG. 3, the common mode current is refluxed only between the inverter 11 of the motor controller 10 and the motor 40 (including the metal housing). Accordingly, when the motor 40 and the motor controller 10 are provided independently, it may be possible to reduce the loop area of the current route into which the common mode current flows as small as possible, and it may be possible to reduce the noise generated by the common mode current effectively. As illustrated in FIG. 3, even when an antenna for receiving radio broadcasting, a television broadcast, or the like is provided to a vehicle, it may be possible to prevent the common mode current from being a source of radio noise.

Incidentally, the housing of the motor controller 10 is independently provided with the ground line 19, and the housing of the motor controller 10 is connected to a body earth of the body 2 of the vehicle by the earth line 13. Since the body earth regarding the motor controller 10 and the housing of the motor controller 10 are performed in a different route, it may be possible to prevent the common mode current from flowing into the motor controller 10 more surely.

As described above, in the present embodiment, the conduction film 34 of the motor controller 10 is used as a connection line by which the metal housing of the motor 40 is connected to the ground line 19 of the motor controller 10. According to this configuration, a dedicated line for the connection line may be unnecessary. That is, the dedicated line may not require to be provided separately.

Second Embodiment

Figure 4:
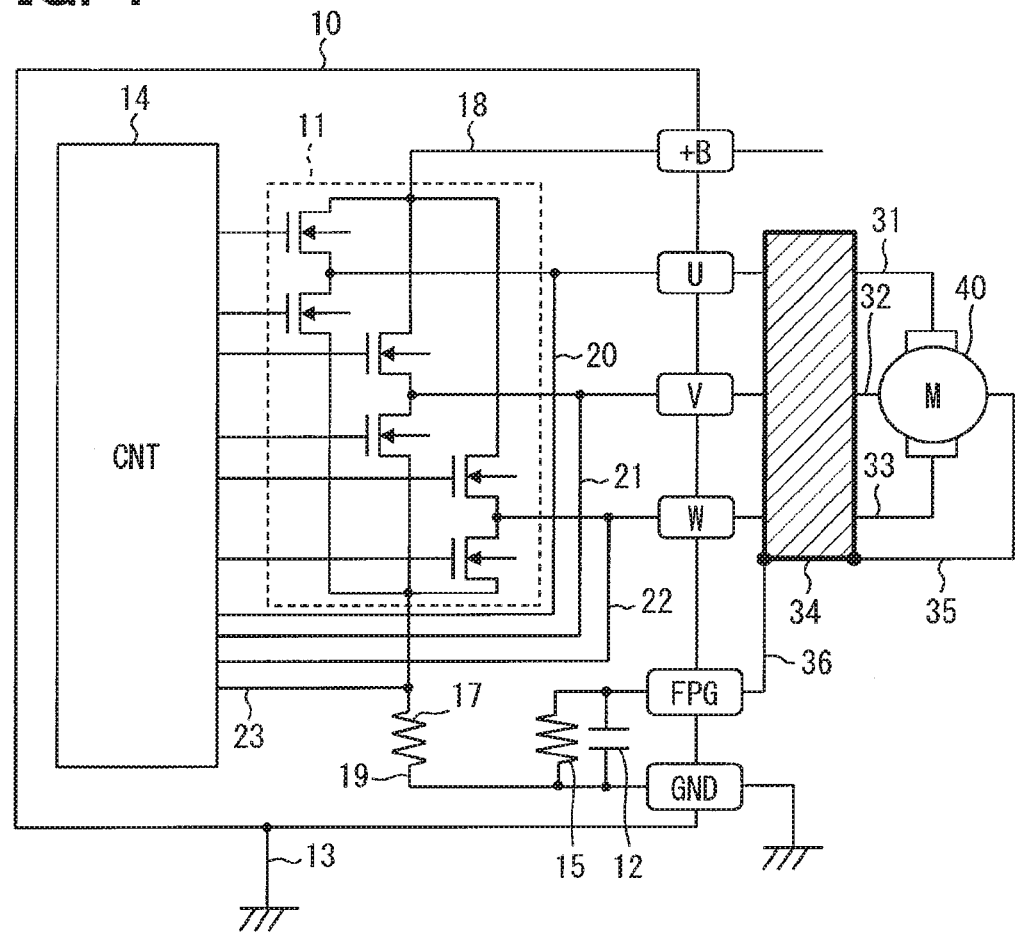
FIG. 4 is a diagram illustrating a schematic configuration of a motor controller of the motor control apparatus in a second embodiment.

A motor control apparatus 100 of a second embodiment will be explained. FIG. 4 is a diagram illustrating a schematic configuration of a motor controller 10 in the motor control apparatus 100 of the second embodiment.

As illustrated in FIG. 4, the motor controller 10 of the second embodiment includes the capacitor 12 and the resistance 15 between the FPC terminal and the ground line 19 without providing a Zener diode. In a case without providing a Zener diode, a potential of the housing of the motor 40 may increase to a high potential due to the leakage current. However, since the leakage current is discharged through the resistance 15, the metal housing of the motor 40 does not keep charging in an excessive potential. Even when a Zener diode is omitted, a substantial difficulty may not occur.

Furthermore, the resistance 15 may be omitted. In the present embodiment, when the conductive film 34 and any one of the core wires in the load line 30 is short circuited, and when an excessive current flows, the motor controller 10 detects the excessive current and enables to stop driving the motor 40.

Third Embodiment

Figure 5:
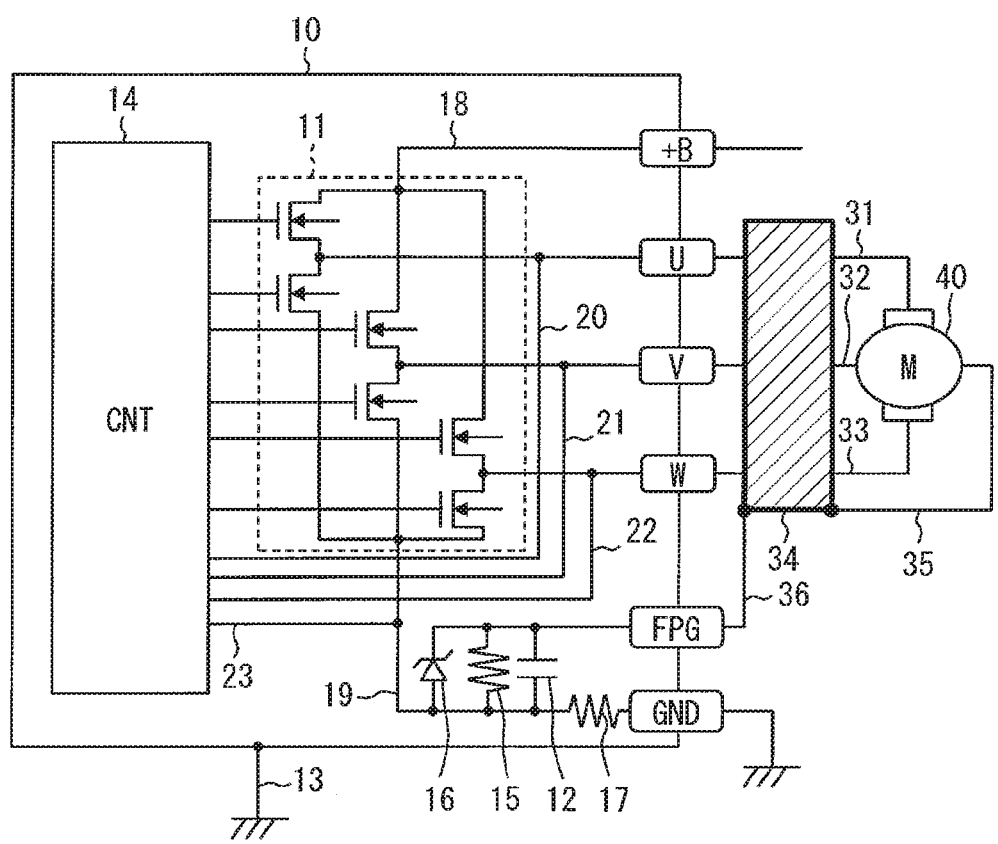
FIG. 5 is a diagram illustrating a schematic configuration of an motor controller of the motor control apparatus in a third embodiment.

A motor control apparatus 100 of a third embodiment will be explained. FIG. 5 is a diagram illustrating a schematic configuration of a motor controller 10 in the motor control apparatus 100 of the third embodiment.

As illustrated in FIG. 5, the third embodiment is provided with a resistance 17 between the capacitor 12 and the ground terminal (GND) of the motor controller 10. The resistance 17 detects an excessive current according to the short circuit between the core wire and the conductive film 34 in the load line 30. Incidentally, the resistance 17 may be provided to an arbitrary position of the ground line 19.

Fourth Embodiment

Figure 6:
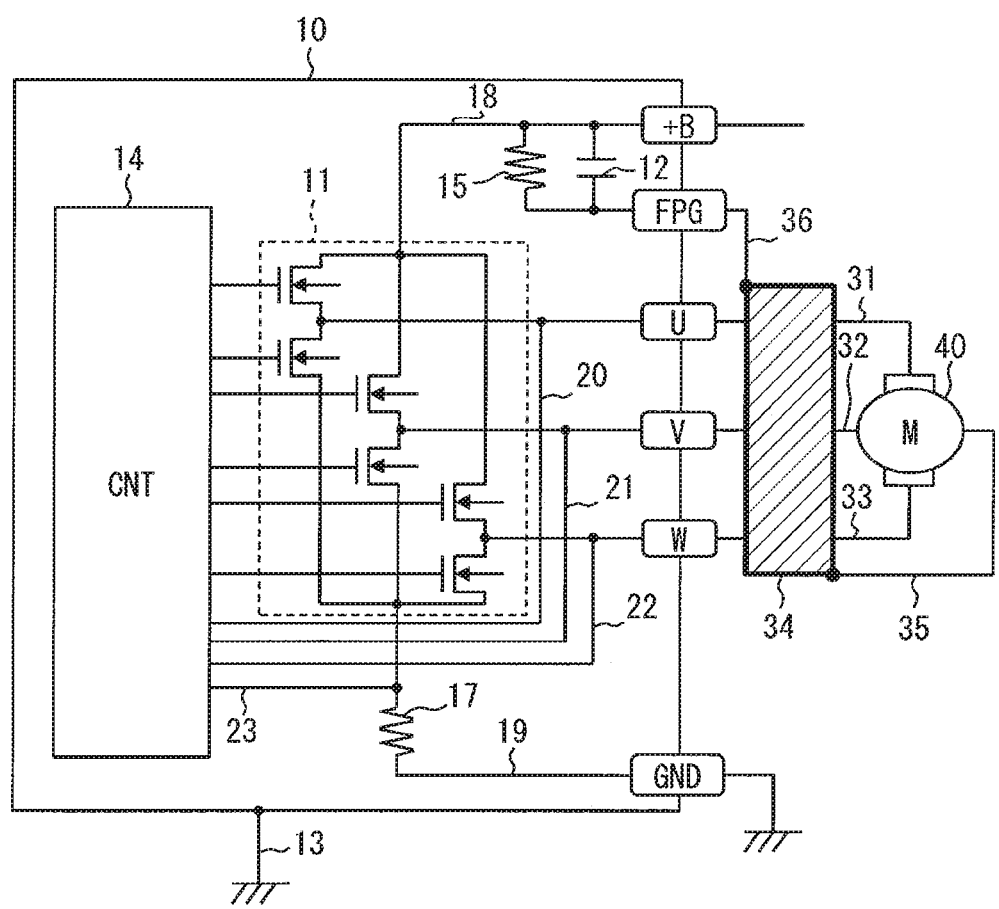
FIG. 6 is a diagram illustrating a schematic configuration of a motor controller of the motor control apparatus in a fourth embodiment.

A motor control apparatus 100 of a fourth embodiment will be explained. FIG. 6 is a diagram illustrating a schematic configuration of a motor controller 10 in the motor control apparatus 100 of the fourth embodiment.

As illustrated in FIG. 6, in the fourth embodiment, the conductive film 34 of the load line 30 is connected to the power source line 18 of the motor controller 10 through the connection line 36. In this case, the common mode current leaked to the metal housing of the motor 40 is refluxed to the inverter 11 of the motor controller 10. Similar to the first embodiment, it may be possible to reduce the loop area of the current route where the common mode current flows as small as possible.

Two capacitors with the same capacitance may be connected in series between the power source line 18 and the ground line 19 in parallel with the inverter 11, and a connection line of the two capacitors may be connected to the metal housing of the motor 40. That is, the metal housing of the motor 40 may be connected to a point having a virtual midpoint potential.

That is, any point having a substantially fixed potential in the inverter 11 of the motor controller 10 may be a point connected with the metal housing of the motor 40.

A preferable embodiment of the present disclosure is described as an example, the present disclosure is not limited to the above described embodiment, and the present disclosure may be performed in various modified manner within a scope of the present disclosure.

For example, the motor control apparatus 100 controls the motor 40 that drives the fuel pump. The motor control apparatus 100 of the present disclosure may be used for a control of a motor that is used in another use. For example, the motor control apparatus 100 may control a motor of an electrically-driven compressor. The motor control apparatus 100 may control a motor that drives a pump drawing up urea water in a case the urea water is used so as to purify emission gas in a diesel engine. The motor control apparatus 100 may control a motor driving a fan disposed to an engine room. That is, when, for example, the motor 40 is disposed to a severe use condition, and when it is difficult to integrate the motor controller 10 and the motor 40 (the motor controller 10 and the motor 40 are provided separately), the motor control apparatus 100 may be used.

While the embodiments, the configurations, and the modes of the motor control apparatus according to the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:
1. A motor control apparatus comprising:
a motor that is mounted to a vehicle and has a metal housing;
a motor controller that
includes a housing and a circuit portion, which is disposed in the housing,
is separately provided with the motor,
is connected to the motor through a load line, and
drives the motor by a drive current transmitted through the load line,
wherein a ground line of the circuit portion is connected to a body of the vehicle as a body earth; and
a connection line that directly connects the metal housing of the motor and the circuit portion of the motor controller, the connection line being electrically non-conductive with the housing of the motor controller.
2. The motor control apparatus according to claim 1, wherein:
the motor controller further includes a power source line; and the connection line is connected either one of the power source line or the ground line of the circuit portion in the motor controller.

3. The motor control apparatus according to claim 1, wherein:
the connection line is inserted into a cable that includes the load line; and
the connection line is connected to the circuit portion of the motor controller through an alternate-current coupling portion that passes an alternate current component and blocks a direct current component.

4. The motor control apparatus according to claim 3, wherein:
the connection line is connected to a resistance that is parallel with the alternate-current coupling portion.

5. The motor control apparatus according to claim 3, wherein:
the connection line is connected to the ground line of the circuit portion of the motor controller; and
the connection line is connected to a Zener diode that is parallel with the alternate-current coupling portion.

6. The motor control apparatus according to claim 1, wherein:
the housing of the motor controller is made of metal; and
the housing of the motor controller is connected to the body of the vehicle by an other line different from the ground line of the circuit portion of the motor controller.

7. The motor control apparatus according to claim 1, wherein:
the connection line is provided by a shield wire of the load line.

8. The motor control apparatus according to claim 7, further comprising:
a current detection portion that detects current flowing through the connection line,
wherein:
when the current detection portion detects a current that is detected at a time the shield wire as the connection line is short circuited with the load line,
the motor controller terminates driving of the motor.

9. The motor control apparatus according to claim 1, wherein
the connection line is electrically isolated from the housing of the motor controller.

* * * * *